Patented Aug. 13, 1940

2,211,429

UNITED STATES PATENT OFFICE 2,211,429

SHAPED ELASTIC MASSES

Martin Mueller-Cunradi and Walter Daniel, Ludwingshafen-on-the-Rhine, Germany, assignors, by mesne assignments, to Jasco, Incorporated, a corporation of Louisiana No Drawing. Application July 1, 1937, Serial No. 151,550. In Germany July 7, 1936

5 Claims. (Cl. 260—42)

The present invention relates to shaped elastic masses.

We have found that shaped elastic masses of especially good properties are obtained by shaping hard organic artificial substances having a cellular foam-like structure in a comminuted state with natural or synthetic binding agents which have elastic and sticking properties. The term elastic means that the said binding agents when stretched at room temperature take their original form after releasing the stretching action.

As hard organic artificial substances which are capable of being brought into a cellular foam-like structure may be mentioned for example resins capable of being hardened such as for example urea and thiourea formaldehyde resins or phenol formaldehyde resins, polyvinyl compounds, as for example polymerized styrene, polymerized vinyl chloride or polymerized vinylcarbazole. The preparation of so-called "foam-bricks" from the said artificial substances is effected in known manner either by stirring in air or other gases or by the addition to the artificial substances or their solutions of agents evolving gases or by suddenly releasing the pressure on solutions of the finished artificial substances in solvents of low boiling point and removing the solvent vapor, if desired with subsequent hardening of the foam-like synthetic substances thus formed. As natural or artificial binding agents having elastic and sticking properties which are suitable according to our invention there may be mentioned, natural and artificial rubber, hydrogenated rubber, polymerized isobutylene, polymerized vinyl ethers or esters and polymerized acrylic esters. Softening agents may be added to these products for the purpose of increasing their elasticity and plasticity in known manner.

The preparation of shaped elastic masses from the said products is preferably effected by first comminuating the "foam brick" concerned for example in a cross-beater mill or kneading machine or on rollers until the desired size is obtained and then working it up with the appropriate binding agent, preferably on rollers or in a kneading machine, if desired while heating. The "foam bricks" may, however, be worked up directly in the form of large pieces with the binding agents, the comminution to the desired size being thereby effected. Dyestuffs, fillers and natural or synthetic resins may also be simultaneously added. The resulting masses may be drawn out into plates or pressed or injected into moulds. When natural or synthetic rubber is used as the binding agent, the masses may be vulcanized in the usual manner.

The masses thus obtained have an extremely large resistance to compression and cracking and great elasticity. Contrary to expectation, they do not lose their porous structure during the working process and are therefore distinguished by especially good insulating power and small specific gravity. They are suitable in particular for the preparation of floor and wall coverings or for lining or coating wood, metal, stone or similar materials.

The following examples will further illustrate how our present invention may be carried out in practice but the invention is not restricted to these examples. The parts are by weight.

Example 1

70 parts of polymerized isobutylene having a molecular weight of about 140,000 are mixed on the rollers with from 200 to 300 parts of comminuted "foam brick" of urea or thiourea formaldehyde resin, prepared according to U. S. Patent 2,076,295 and drawn out into plates. If desired 35 parts of colophony or other natural or also synthetic resin may be added to increase the hardness. Polymerized vinyl isobutyl ether of a high degree of polymerization, hydrogenerated rubber or also natural or synthetic rubber may be used instead of polymerized isobutylene.

A still greater strength and hardness are obtained by using polymerized isobutylene of higher molecular weight, for example 300,000.

Example 2

A colored wall covering having a lustrous surface is obtained by mixing 70 parts of polymerized isobutylene, 230 parts of the comminuted "foam brick" described in Example 1 and 90 parts of colcothar in a kneading machine and coating the plates prepared therefrom on rollers with a lacquer solution.

Example 3

70 parts of polymerized acrylic acid ethyl ester are mixed with 230 parts of of the comminuted "foam brick" described in Example 1 and drawn out into plates. The resulting plates are highly elastic and extremely insensitive to percussion and thrusts. Moreover they are stable to many solvents, in particular to benzine.

Example 4

100 parts of natural rubber (smoked sheets) are mixed with from 40 to 100 parts of the "foam brick" described in Example 1, 5 parts of zinc oxide, 3 parts of sulphur, 2.5 parts of a vulcanization accelerator and 1 part of a condensation product derived from aldol and alpha-naphthylamine and vulcanized for 90 minutes at 127° C. in a mould. Highly elastic plates are obtained which are similar to soft or hard rubber depending on the amount of "foam brick" added.

Rubber-like polymerization products such as the polymerized butadienes, i. e. polymers of butadiene itself or of mixtures of butadiene and acrylic nitrile or styrene can also be employed instead of natural rubber as the binding agent.

*Example 5*

70 parts of polymerized isobutylene having a molecular weight of 300,000 are rolled with 35 parts of colophony and 20 parts of polymerized styrene of foam-like structure in a comminuted state. The resulting product is eminently suitable for wall coverings.

What we claim is:

1. Shaped elastic masses comprising a hardened urea aldehyde resin having a cellular foam-like structure and being in a comminuted state, and highly polymerized isobutylene as a binding agent.

2. Shaped elastic masses comprising a hardened urea aldehyde resin having a cellular foam-like structure and being in a comminuted state, and natural rubber as a binding agent.

3. Shaped elastic masses comprising polystyrene having a cellular foam-like structure and being in a comminuted state and highly polymerized isobutylene as a binding agent.

4. Shaped elastic masses comprising a hardened urea aldehyde resin having a cellular foam-like structure and being in a comminuted state, and as the binding agent a rubber-like elastic highly polymerized organic substance selected from the class consisting of natural rubber, polymerized butadienes, hydrogenated rubber, polyisobutylene, polyvinyl ethers, polyvinyl esters and polymerized acrylic esters.

5. Shaped elastic masses comprising a hardened resin selected from the class consisting of urea- and phenol aldehyde resins and polyvinyl resins having a cellular foam-like structure and being in a comminuted state and as the binding agent a rubber-like elastic, highly polymerized organic substance selected from the class consisting of natural rubber, polymerized butadienes, hydrogenated rubber, polyisobutylene, polyvinyl ethers, polyvinyl esters and polymerized acrylic esters.

MARTIN MUELLER-CUNRADI.
WALTER DANIEL.